United States Patent
Kastalsky et al.

(10) Patent No.: US 7,102,157 B2
(45) Date of Patent: Sep. 5, 2006

(54) NANOTUBE-BASED VACUUM DEVICES

(76) Inventors: Alexander Kastalsky, 3 Kenneth Dr., Wayside, NJ (US) 07712; Sergey Shokhor, 3 Leeward La., Port Jefferson, NY (US) 11777

( * ) Notice: Subject to any disclaimer, the term of this patent is extended or adjusted under 35 U.S.C. 154(b) by 0 days.

(21) Appl. No.: 11/134,800

(22) Filed: May 23, 2005

(65) Prior Publication Data
US 2005/0247929 A1    Nov. 10, 2005

Related U.S. Application Data

(63) Continuation-in-part of application No. 10/764,168, filed on Jan. 26, 2004.

(51) Int. Cl.
*H01L 35/24* (2006.01)
(52) U.S. Cl. .................. 257/40; 977/876; 977/938
(58) Field of Classification Search .............. None
See application file for complete search history.

(56) References Cited

U.S. PATENT DOCUMENTS 6,891,320 B1 *  5/2005  Nakamoto ................ 313/311
6,897,009 B1 *  5/2005  Johnson et al. .......... 430/315

* cited by examiner

*Primary Examiner*—Wai-Sing Louie

(57) ABSTRACT

New, hybrid vacuum electronic devices are proposed, in which the electrons are extracted from the nanotube into vacuum. Each nanotube is either placed on the cathode electrode individually or grown normally to the cathode plane. Arrays of the nanotubes are also considered to multiply the output current. Two- and three-terminal device configurations are discussed. In all the cases considered, the device designs are such that both input and output capacitances are extremely low, while the efficiency of the electron extraction into vacuum is very high, so that the estimated operational frequencies are expected to be in a tera-hertz range. New vacuum triode structure with ballistic electron propagation along the nanotube is also considered.

19 Claims, 11 Drawing Sheets

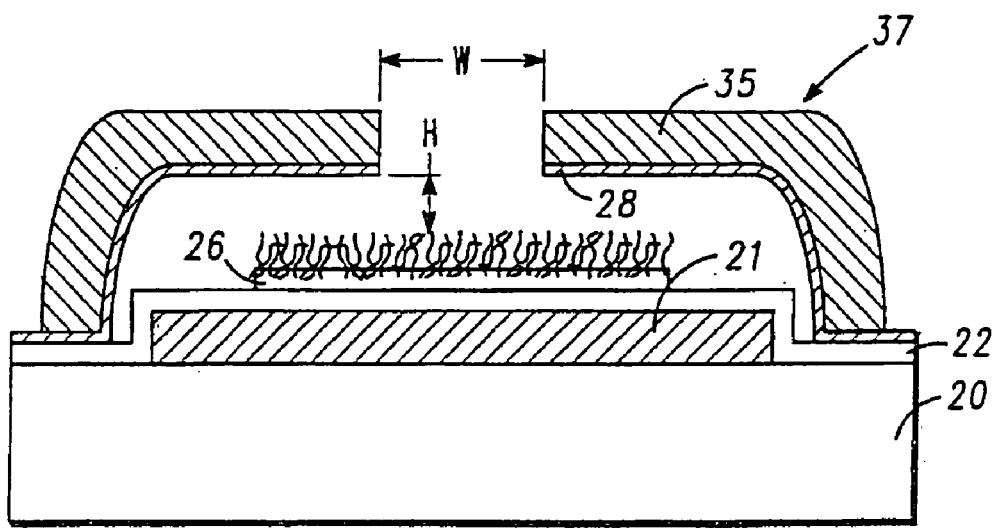
Fig.A

NANOTUBE-BASED VACUUM DEVICES

This is a continuation-in-part of application Ser. No. 10/764,168, filed Jan. 26, 2004.

FIELD OF THE INVENTION

This invention relates to new devices for vacuum electronics. In particular, it utilizes nanotubes as cold emission electron sources in the two- and three- terminal devices.

BACKGROUND OF THE INVENTION

The nanotubes are viewed to be a new approach in electronics with potential to drastically extent the frequency range of modem electronic devices. Such unique properties as quantization of the electron spectrum, ballistic electron propagation along the tube, current densities as high as $10^9$ $A/cm^2$, existence of the semiconductor phase, possibilities for n- and p- doping and fabrication of transistors, make the nanotubes a great candidate for future high-speed device technology.

Another very important application of the nanotubes is cold cathodes, which are based on low threshold electron field emission due to strong electrical field focusing at the nanotube end. Due to extremely small nanotube diameter, about 1 nm for a single walled nanotube, the electron emission threshold from the nanotube is within 0.1–1 V per micron of the anode-cathode space. This technology is currently under intense investigation for application to the flat panel displays.

It looks very promising to combine the solid-state device technology and cold cathode emission in a single device to produce a new approach in a hybrid, vacuum electronics, where the nanotube will be considered as an electron source. This approach will be extremely helpful in overcoming fundamental problems of the Si-based electronics. The electron velocity in vacuum as high as of $10^9$ cm/s can be achieved, which is two orders of magnitude larger than electron velocity in the FET channel. This is a key factor for dramatic increase of the device operational frequency range. Additionally, due to vacuum dielectric constant equal to one, and specific vacuum device design capabilities, the input capacitances can be significantly reduced. There is no need in this case for decreasing the gate length to a submicron distances to increase the device frequency band width, and hence much more relaxed device processing can be implemented. In addition, high anode (output) voltages and currents, much grater than in Si FETs, are well within the capabilities of vacuum electronics. Finally, since the mechanism of electron field emission is essentially temperature independent, the temperature range of operation of the proposed hybrid devices will be much larger than that in similar semiconductor devices.

The problem of vacuum electronics is related to a reliable and compact electron source, to replace the commonly used hot filament cathode. The obvious alternative to the hot cathode is the cold cathode, which is typically formed as a metal tip from which electrons are extracted with the gate electrode, see e.g. C. A. Spind, U.S. Pat. No. 3,755,704. However, such a design has fundamental problems of a high input (emitter-gate) capacitance and relatively high threshold voltage for electron emission. In addition, this structure is three-dimensional and requires complex technique for its fabrication, not compatible with modem planar semiconductor IC technology. It seems therefore extremely attractive to attach improved, the nanotube-based, cold cathode emitter to a vacuum device fabricated with modern planar semiconductor IC techniques, to combine the best properties of the two technologies.

There have been several patents and publications, in which the nanotubes have been used as the electron source in the vacuum devices. The overwhelming majority of them is related to the field emission displays, which is currently the most advanced area for the field emission applications.

Several patents also utilize the nanotubes as electron sources in the vacuum electronic devices, such as M. Takai, U.S. Pat. No. 2003/0090190A1; K. M. Choi et al, U.S. Pat. No. 6,504,292; C. Bower et al, U.S. Pat. No. 6,630,772; S. Jin at al U.S. Pat. No. 6,250,984; E. Howard et al U.S. Pat. No. 6,626,720; L. Karpov et al U.S. Pat. No. 6,607,930, E. M. Howard et al , U.S. Pat. No. 6,626,720B1 and S. M. O'Rourke, U.S. Pat. No. 6,406,926.

There are several fundamental factors however which separate the proposed devices, according to the present invention, from the previous art:

1. In all the cited patents, the gate (input) electrode is made essentially on top of the cathode electrode, thereby making the input capacitance high and reducing the frequency of the device operation. In the proposed devices, the design is such that both input and output capacitances are minimized.
2. In all the cited patents, the nanotubes are deposited on a metal pad essentially as an indiscriminate mass in the form of an ink, powder, slurry, or electrophoretically. This significantly reduces the nanotube efficiency. In the proposed device, according to the present invention, each nanotube is treated individually and properly positioned to enhance the device performance. When multiple nanotubes are used, they represent an array of individual nanotubes grown on the preliminary prepared pads of a catalytic material. This implies that a single nanotube is sufficient for the device operation, and the nanotube array is used only to proportionally increase the emission current.
3. In all the cited patents, the controlling gate electrode serves to extract electrons from the nanotube, which inevitably creates undesirable effect of current leakage to the gate electrode. In the proposed devices, according to the present invention, the role of the gate electrode is wider and depends on the physical mechanisms involved. In some devices considered, the gate electrode can be biased negatively and thereby quenches the current to the anode. In this case, there is no current to the gate, which is an important factor for many three-terminal device applications. In one device presented, the gate voltage is applied to the nanotube itself through the film of an insulator, like in a regular FET. In another device, representing a new ballistic electron source, the controlling electrode is attached directly to the nanotube to produce a potential difference along the nanotube. Finally, in one of the three-terminal device designs, the gate is biased positively and extracts electrons from the nanotube thereby serving as a part of the electron cold cathode. All these features imply that the scope of physical processes considered in the present invention is much greater than those discussed in the cited patents.
3. In the cited patents, the described methods of the device fabrication include the procedure of nanotube placement onto the emitter metal pad somewhere in the middle of the device processing, after which other steps, including photolithography, are made. The subsequent technological operations after nanotube placement are known to adversely affect the nanotube efficiency as an electron source. In the proposed devices, the nanotube placement or growth is the last processing step in the device fabrication.

Fig. A (Prior art) clearly demonstrates typical approach in making the nanotube based vacuum devices using multiple nanotubes deposited or grown on the entire cathode surface, see U.S. Pat. No. 6,626,720. The input capacitance of such a device is relatively high. The nanotube placement is followed by several processing steps, which may degrade the nanotube performance.

SUMMARY OF THE INVENTION

The presented below device structures have in common one important element, namely, the nanotube as an electron source, from which electrons move in vacuum to the positively biased anode electrode. The nanotubes are placed or grown on the cathode metal electrode in close proximity to the gate electrode (or anode electrode if the diode is under consideration) to minimize the threshold voltage for the electron emission.

In the devices discussed below, according to the present invention, the nanotubes are treated individually, so that a single nanotube is sufficient for the device operation. The important feature in the majority of presented device designs is extremely low input and output capacitances to maximize the device speed (see below). The nanotubes are placed or grown on the cathode electrode, while all other elements are made using modern planar batch fabrication IC technology. This is an important factor for future possibilities of mass production of nanotube-based, hybrid, high-speed vacuum electronic devices and circuits. Furthermore, the growth of the nanotubes in predetermined positions using e-beam lithography, provides the entire device fabrication cycle for industrial production. It is also important that the number of steps for the device fabrication is very limited: one needs 3–4 photolithography masks versus 10–11 masks for the Si-based transistor, while the most appropriate substrate for vacuum devices is a piece of glass. These factors make the manufacturing cost for these devices significantly lower than that for the Si-based electronics.

The unique property of the proposed hybrid devices is extremely sharp dependence of the electron field emission current on the cathode-anode voltage, which originates from the mechanism of electron field induced tunneling into vacuum which is determined by the well known Fouler-Nordheim I-V dependence. This dependence is much sharper than typical exponential curve of the forward bias semiconductor diode at room temperature, $\sim\exp(eV/kT)$. This yields much higher rectification ratio than in semiconductor diodes. Taking into account small, less then micron, anode-cathode distances, one can obtain the threshold for the current emission from the nanotube within a fraction of a volt, and thus create the most efficient and the fastest diode, far superior than typical Si p-n diode or any Schottky diode. The same field emission mechanism provides extremely high transconductance for the proposed active elements, such as triodes (see below).

It is also important that the anode can be moved away from the cathode and gate electrodes without compromising the device speed due to high electron velocity in vacuum. This provides an opportunity to increase the anode (output) voltage to the values which are not attainable in Si-based devices.

Planar device technology used for the proposed devices allows realization of a simple approach for making vacuum chamber as a small cavity over the device structure using conventional methods of dielectric coatings, which significantly reduces the device production cost, see R. S. Mullar et al U.S. Pat. No. 5,493,177. Furthermore, in the structures where the cathode-anode distance is made shorter than 1 μm, and therefore comparable with electron mean free path in the normal atmosphere, there is no need for vacuum. It is preferable in this case to fill the cavity with an inert gas, to minimize possible oxidation and degradation of the nanotube tip.

Computer simulations of the nanotube-based diode and triode having specific device designs, according to the present invention, show the input capacitance in the range of $C=10^{-18}F$ per μm gate width. Taking the triode transconductance as $G\sim10^{-6}A/0.1V\cdot\mu m=10^{-5}S/\mu m$ from the Fouler-Nordheim I-V dependence for the nanotube current of 1 μA, one obtains the characteristic device delay time of $\tau=C/G\sim10^{-13}s$. This implies unique frequency band width of the proposed transistors, above tera-hertz frequency range.

The proposed vacuum device technology is entirely compatible with Si IC technology. All fabrication processes needed for the nanotube vacuum electronics can be produced on the Si substrate. The combination of both techniques can be very helpful in increasing the speed of the Si-based circuitry, as well as raising the output voltages.

It is important to emphasize that the proposed devices have a huge advantage over semiconductor-based diodes and transistors with respect to the temperature range of operation. The temperature range of semiconductor devices is controlled by the semiconductor energy gap, and temperature limitation comes from the process of activation of the minor carriers across this gap. For silicon, this factor limits the operational temperature below ~85° C. In the proposed devices, the field-emission electron tunneling has essentially no temperature factor involved in the process. This is why the hybrid devices, according to the present invention, have a very large temperature range of operation, which is limited by such factors as vacuum deterioration, material degradation or rise of hot electron emission from the cathode. These factors may become significant at the temperatures exceeding 400° C.

Finally, although only two- and three-terminal devices are discussed below, it is understood that more complex, multi-electrode device designs can be implemented within the same approach.

The designs of the proposed devices, according to the present invention, are such that the direction of electron fluxes in vacuum can be different, depending on the device configuration and geometry. In some designs, the electrons propagate laterally, along the substrate plane. In other designs, electrons move normally to the substrate. Finally, there are device configurations where the electrons are extracted from the nanotubes normally and then turn laterally to reach the anode. All the device configurations considered have in common two important features, namely, low threshold for the electron emission and very low input capacitance.

The main objectives of the present invention are to present novel nanotube-based, hybrid, vacuum electronic devices, as well as discuss their main functions, features and methods of their manufacturing. Below in this section, the presented devices are listed and numerated, while the device operation will be analyzed later in conjunction with the corresponding drawings.

Diode 1 with the nanotube (or nanotube array) placed on the cathode electrode.

Diode 2 with nanotube (or nanotube array) grown on the cathode electrode.

Triode 1 with nanotube (or nanotube array) placed on the cathode electrode.

Triode 2 with nanotube (or nanotube array) grown on the cathode electrode.

Triode 3 with gate electrode on the nanotube.

Triode 4 with ballistic electron propagation in the nanotube.

DETAILED DESCRIPTION OF THE INVENTION

The majority of the devices presented, has in common an important feature, namely, extremely short distance between the nanotube tip and the gate electrode (or anode electrode, if the diode is considered) to minimize the control voltage for the device operation. At the same time, the device design allows for low input capacitance. For that purpose, the cathode and the gate electrodes are laterally shifted from each other to avoid their overlap, while their planes are separated from each other by the thickness of the dielectric layer. Using self-align method of deposition of the gate electrode (or anode electrode for a diode) next to the cathode electrode, one obtains the cathode-gate (anode) distance essentially controlled by the thickness of the dielectric film, which can easily made within a fraction of a micron.

Figure 1:
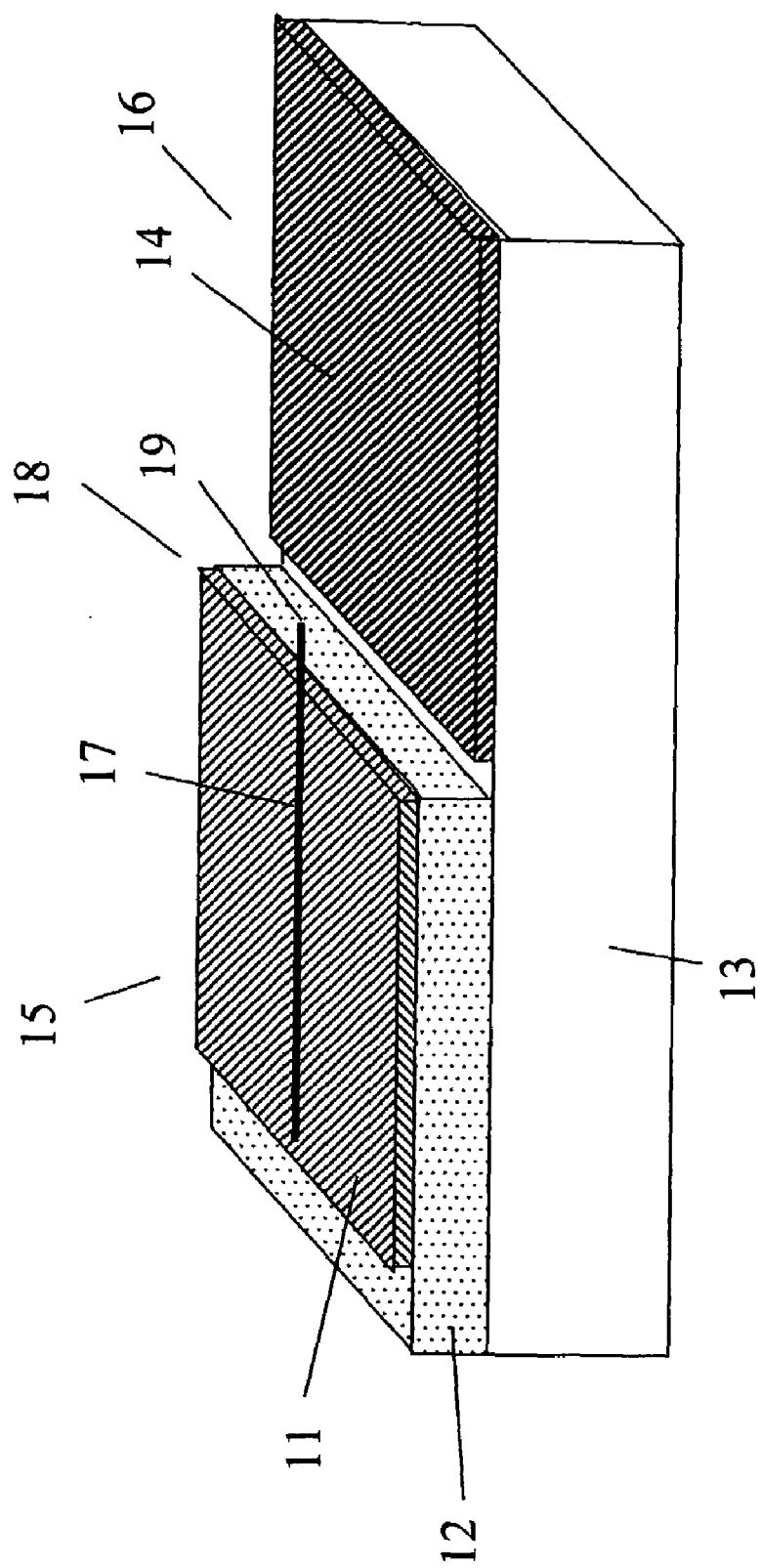
FIG. 1 shows the Diode 1 with the nanotube placed on the cathode electrode.

FIG. 1 illustrates the preferred embodiment of the Diode 1. The conducting film 11 of the cathode electrode 15 is placed on the dielectric film 12 deposited on the substrate 13. The substrate is preferably a piece of glass, however other materials, such as Si wafer, can also be used. The conducting film 14 of the anode electrode 16 is placed directly on the substrate, so that the anode plane is below the cathode plane by a thickness of a dielectric film.

The chosen configuration of the cathode and anode electrodes in the shape of two pages of an opened book ensures minimum cathode-anode capacitance. The anode electrode conducting film 14 is placed next to the cathode electrode conducting film 11 using self-aligned layer deposition technique. The nanotube 17 is placed on the cathode conducting film 11 normally to the cathode edge 18. To provide electric field concentration at the nanotube tip 19, the nanotube is protruded into the area of the anode electrode 16. Such a design implies that the distance between the nanotube tip 19 and the anode electrode is essentially determined by the thickness of the dielectric film 12, which can be made as thin as 0.2–0.3 μm. If the threshold field for the electron emission is taken as 1V/μm, one obtains the threshold voltage for electron emission of 0.2–0.3 V, which is close to the forward biased threshold voltage of the Si-based diode.

As it was mentioned above, in the presented devices both the sharpness of the I-V characteristic and the speed are much higher than those on the Si diode or the Schottky diode. Furthermore, since in the reverse bias polarity there is no electron emission, the reverse biased diode current will be absent. All these features provide extremely high ac rectification factor $r_r/r_f$, where $r_r$ and $r_f$ are respective differential resistances in reverse and forward bias directions, see e.g. S. M. Sze, Physics of Semiconductor Devices, John Wiley and Sons, NY.

More than one nanotube can be placed in a similar position (not shown) to multiply the output current. A single walled nanotube (vs. multi walled nanotube) is preferable, due to its smaller diameter and thus higher electric field concentration at the tip.

Figure 2:
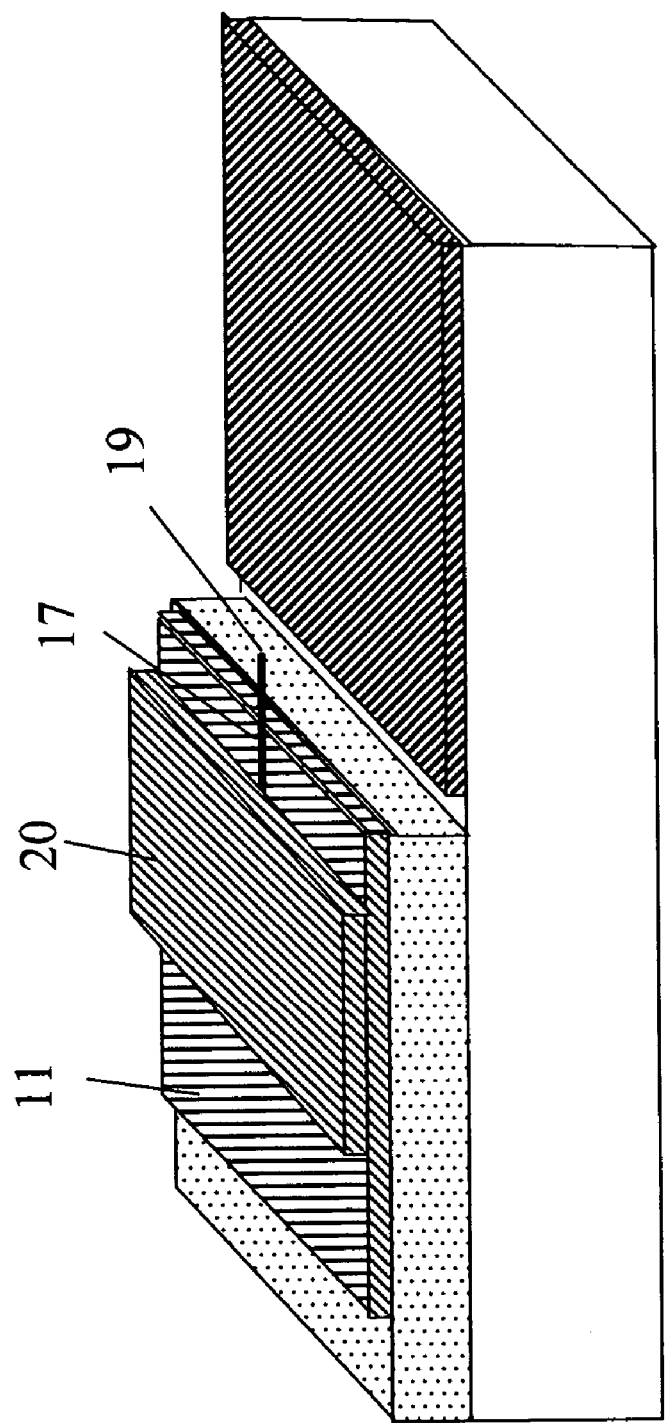
FIG. 2 shows the Diode 1 with additional conducting layer on top of the nanotube.

FIG. 2 shows the Diode 1, wherein the nanotube 17 is covered with additional conductive film 20 to minimize the contact resistance between the nanotube and the cathode conductive layer 11. Low contact resistance is important factor for reliable and efficient device operation.

Figure 3:
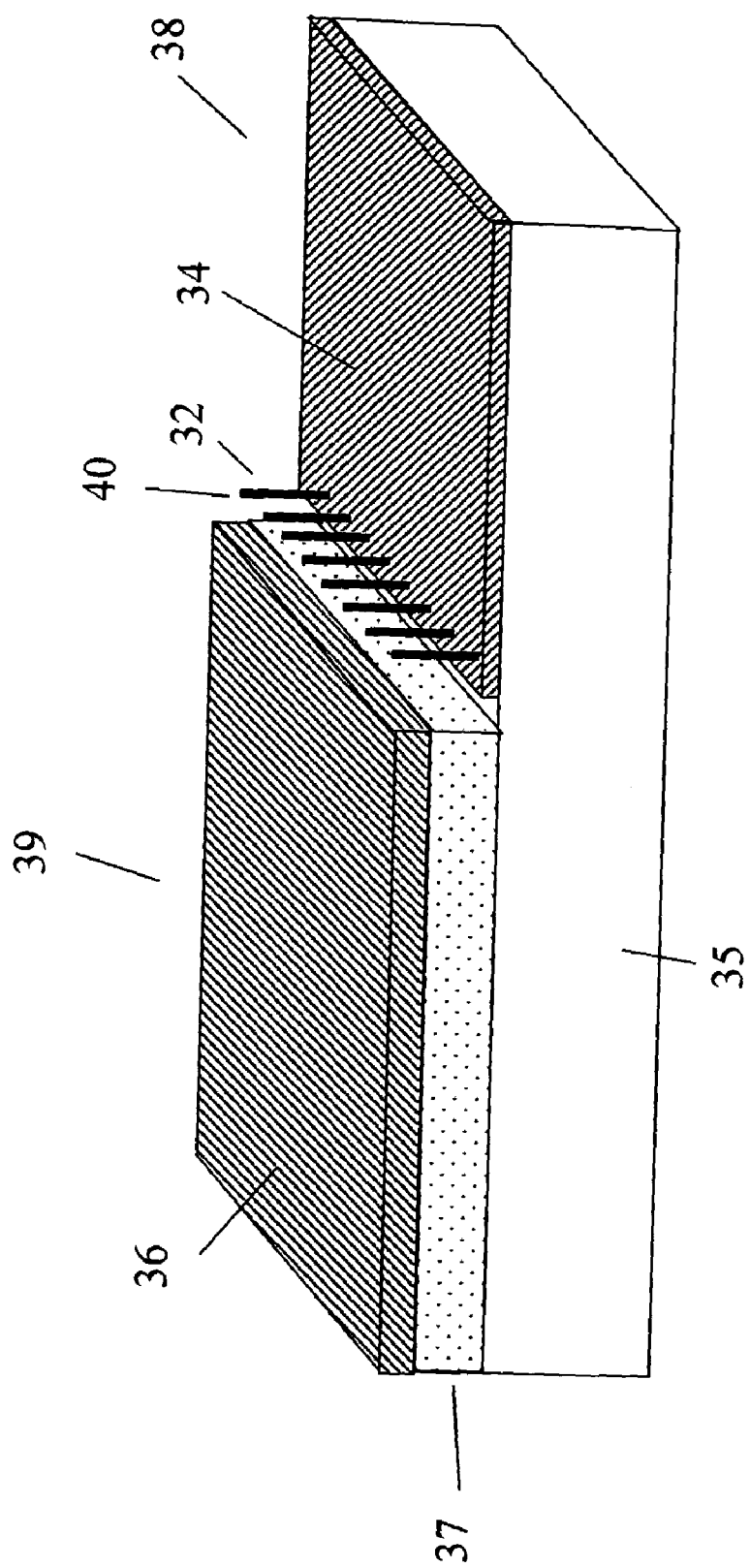
FIG. 3 shows the Diode 2 with the nanotube grown on the cathode electrode.
Figure 4:
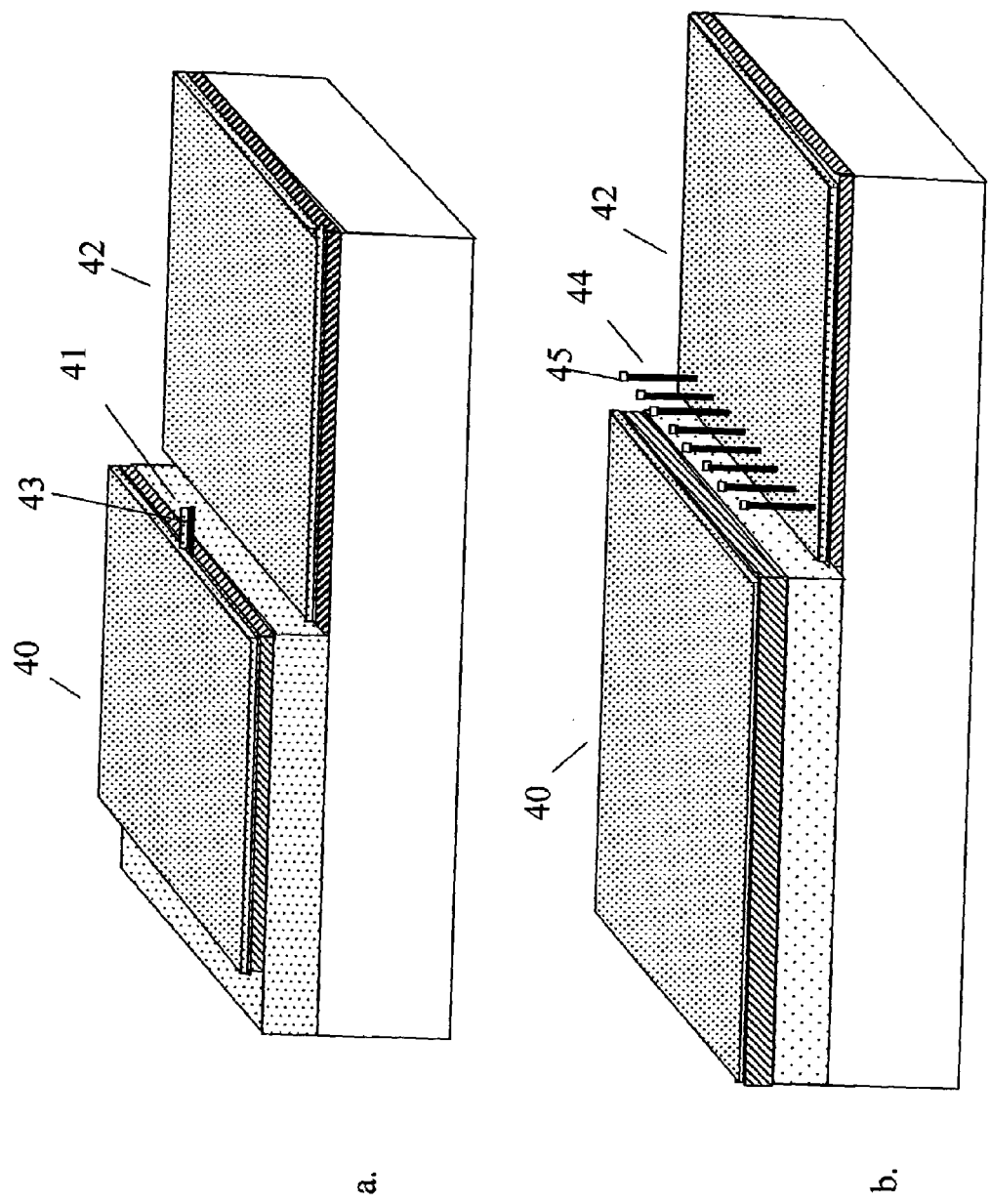
FIG. 4 shows the Diode 1(*a*) and Diode 2(*b*) with nanotube tips coated with conducting layer.

FIG. 3 shows the Diode 2, wherein an array of the nanotubes 32 is grown on the cathode conductive film 34. The geometry of the cathode and anode electrodes is similar to that of the Diode 1. However, the cathode electrode 38 is placed on the substrate 35, while the anode conductive film 36 of the anode electrode 39 is placed on the dielectric film 37. The nanotubes are grown vertically on the cathode conductive film 34 in a close proximity to the edge of the anode conductive film 36. The nanotube growth is activated by deposition of small pads of catalytic material, typically transition metals Fe, Ni, Co. The nanotube length is chosen to be such that the nanotube tip 40 reaches, or slightly below, the plane of the anode conductive film 36 to minimize the cathode-anode distance. In both above presented diodes, the nanotube tips are exposed. However, similar devices are capable of operation when the entire nanotube including the tip is covered with a thin conductive film to reduce the nanotube resistance and increase the output current amplitude. FIG. 4 illustrates two such devices. FIG. 4*a* shows the Diode with the nanotube 43 placed on the cathode electrode 40 as in the Diode 1. The device is then coated with a thin conductive layer which covers the entire tube including the tip 41.

FIG. 4*b* shows another Diode version, wherein the nanotubes 44 are grown on the cathode electrode 42, as in the Diode 2. The tips are coated with the conductive layer 45. In both cases presented in FIG. 4 the conductive material with a low work function for electron escape into vacuum, such as Cs, is preferable. This will further reduce the electron emission threshold voltage.

The diodes designs in FIGS. 1–4, illustrate a hybrid nature of the proposed approach, according to the present invention: the cathodes with the nanotubes represent a solid-state part of the device, while the vacuum gap between the nanotube tip and the anode belong to the vacuum part of the device. Such a combination allows realization of a new class of devices, superior over semiconductor devices in many key aspects, such as the speed, efficiency, cost and temperature range of operation.

Figure 5:
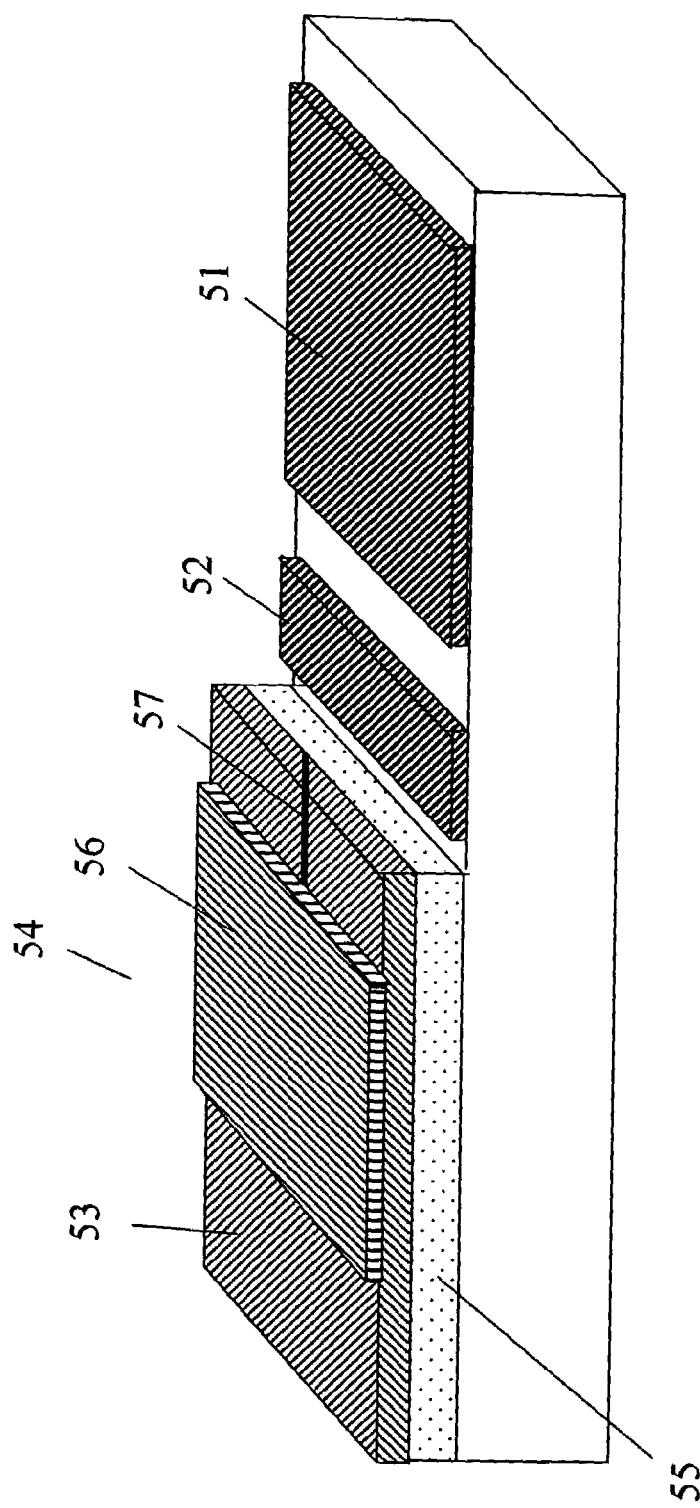
FIG. 5 shows the Triode 1 with the nanotube placed on the cathode electrode.

FIG. 5 shows the Triode 1. The device structure is similar to that of the Diode 1, to which additional, anode, electrode 51 is added, while the second electrode 52, coplanar with the anode electrode 51, plays the role of the gate electrode to modulate the output, anode, current. The conductive film 53 of the cathode electrode 54 is placed on the dielectric film 55. The top conductive film 56 is placed on the nanotube 57, as in the case of the Diode 1 of FIG. 2, to ensure a good electrical contact between the conductive film 53 and the nanotube 57.

In this design, it is preferable to keep the anode electrode 51 close to the gate electrode 52 to induce the direct cathode-to-anode field emission current by applying a sufficient positive voltage to the anode 51, while small negative voltage to the gate electrode 52 modulates the anode current. Due to low value of the gate voltage and sharp dependence of the emission current on the gate voltage, one obtains a high device transconductance. The lateral shift of all the electrodes from each other ensures low input and output capacitances, and together with high transconductance, very large frequency range of operation. Finally, because of negative gate voltage polarity, the gate current is practically absent, an important factor for many circuit applications. Finally, an array of similar nanotubes can be placed at the edge of the cathode electrode 53 to multiply the output current (not shown). It is also beneficial to have metal type, single walled nanotubes to obtain the best device performance.

In another device embodiment, a relatively small positive gate voltage induces the electron emission current, and the anode voltage, larger than the gate voltage, controls the output current. In this case, the gate electrode becomes a part of the cold cathode, while the anode collects free electrons. Like in hot cathode devices, if all electrons created by the cathode are swept towards the anode, the I-V characteristics will show a current saturation. In a hot cathode approach, however, the current level is changed only by temperature variation of the cathode filament, while in the proposed embodiment the current level is modulated by a positive gate voltage. To provide a good current saturation in the proposed cold cathode design, one should minimize the contribution of the anode voltage to the gate induced electron extraction process. This implies that the anode electrode 51 should be moved far enough from the cathode electrode 54 to reduce the cathode-anode electric field.

Figure 6:
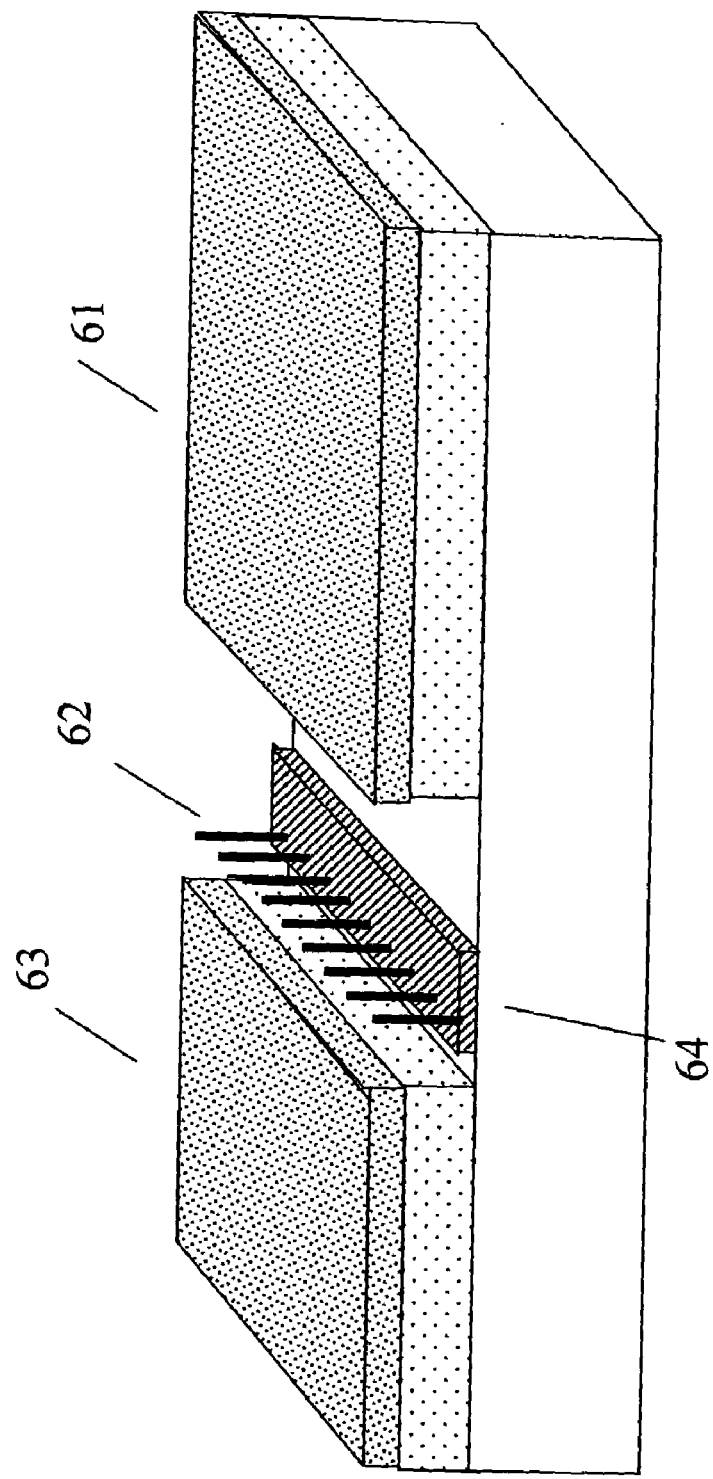
FIG. 6 shows the Triode 2 with the nanotube grown on the cathode electrode.

FIG. 6 shows another triode version, the Triode 2, wherein the nanotubes 62 are grown on the cathode electrode 64 close to the gate electrode 63. This triode is technologically similar to the Diode 2. The only difference is addition of the anode electrode 61 as a collector of the electrons emitted by the nanotubes 62. The gate electrode 63, coplanar with the anode electrode 61, modulates the cathode-anode current. Both gate voltage polarities discussed for current modulation in the Triode 1, are applicable to the Triode 2 as well.

Figure 7:
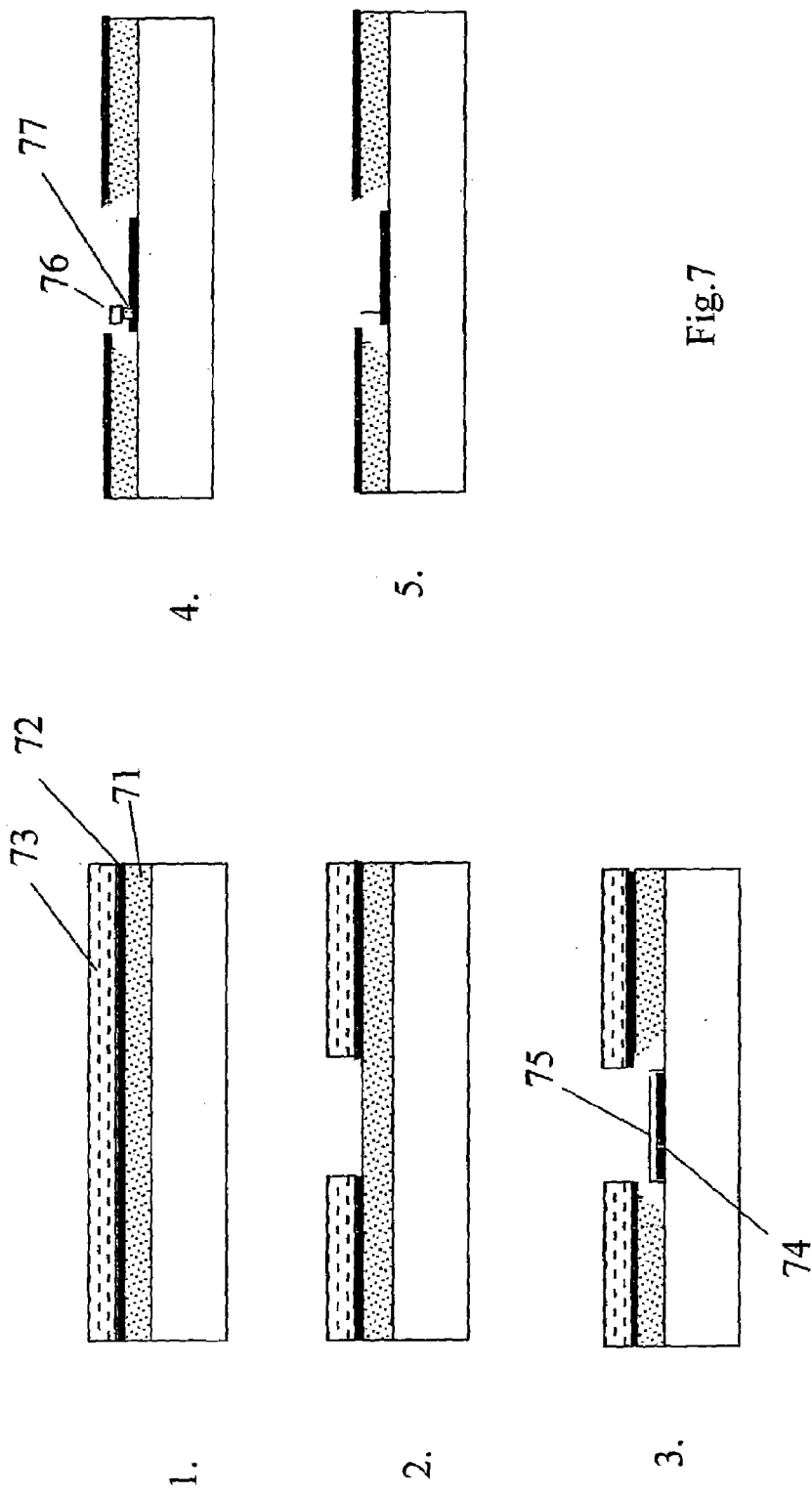
FIG. 7 shows the basic fabrication steps for the Triode 2.

FIG. 7 illustrates the basic technological steps for fabrication of the Triode 2. The processing starts from deposition of a dielectric film 71, followed by deposition of the conducting film 72, to make the device electrodes, and then covered with the photoresist 73, see FIG. 7.1. After photoresist patterning, the deposited conductive and dielectric films are etched to form a well, see FIG. 7.2, and conducting layer 74 is then deposited using self-aligned technique to form the gate electrode, see FIG. 7.3.

The nanotube growth procedure requires placement of seeds of a catalytic material, such Fe, Ni or Co. A thin film of such material 75 is then deposited on top of the conductive film 74, see FIG. 7.3. To minimize the nanotube diameter, it is preferable to make the pads of the catalytic material as small as possible. For that purpose, e-beam lithography is used to fabricate small size photoresist pads 76 see FIG. 7.4. Then etching of the layer of the catalytic material takes place to create small islands of the catalytic material 77 and further reduce their size. The final processing step is the growth of the nanotube(s) on these pads, see FIG. 7.5. As in previous designs, the electrode geometry provides extremely low capacitance, while small, less than μm, cathode-anode distance yields low threshold for the emission current.

Figure 8:
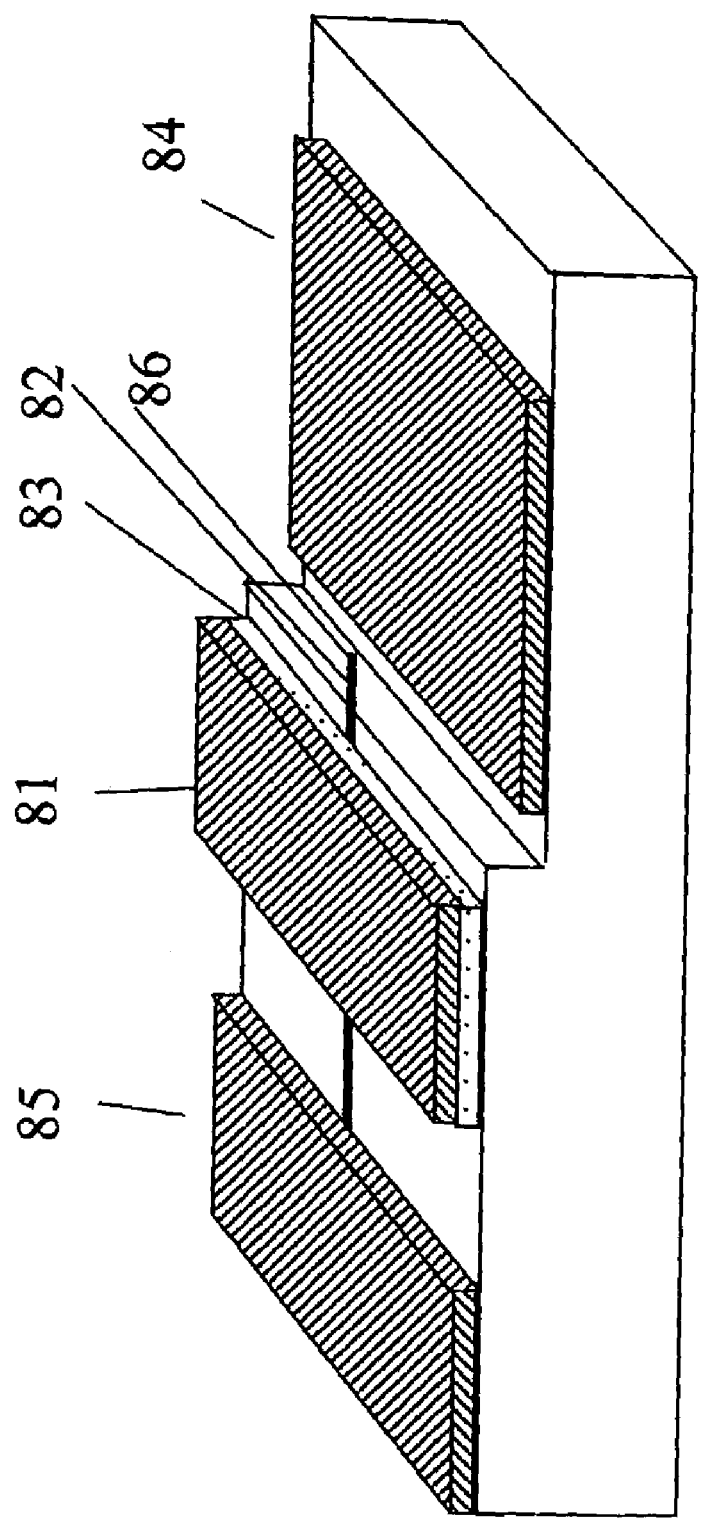
FIG. 8 shows the Triode 3 with the gate electrode placed on the nanotube.

The Triode 3, shown in FIG. 8, illustrates another three-terminal embodiment, wherein the gate electrode is attached to the nanotube through the dielectric film. In this case, to have a capability of variation of the carrier density in the nanotube, semiconductor nanotube is used, and like in a conventional FET, the gate on top of the nanotube modulates the current through the nanotube due to gate induced variation of the carrier concentration. The effect of gate-induced carrier modulation in the nanotube is applied for designing a vacuum transistor, wherein the electrons from the nanotube escape into vacuum and reach the anode. The nanotube tip 86 is exposed and protrudes into the territory of the anode electrode 84 to minimize the threshold voltage for electron extraction, induced by the anode voltage. In this embodiment, the cathode electrode 85, the gate electrode 81 and the gate insulation layer 83 represent a solid-state portion of the device, while the nanotube tip 86 and the anode/drain electrode 84 belong to the vacuum part of the device. The gate modulation efficiency of the carriers in the nanotube, was shown to be very high, see e.g. R. H. Baughman, et al, Science, V.297, p.787,2002, C. Bower et al Appl.Phys.Lett. V.80, p.382,2002, and A. Bachtold, et al Science, V.294, p.1317, 2001. The vacuum output device structure, with the anode/drain electrode separated from the rest of the device by a vacuum gap, provides high output voltages and high device speed.

Figure 9:
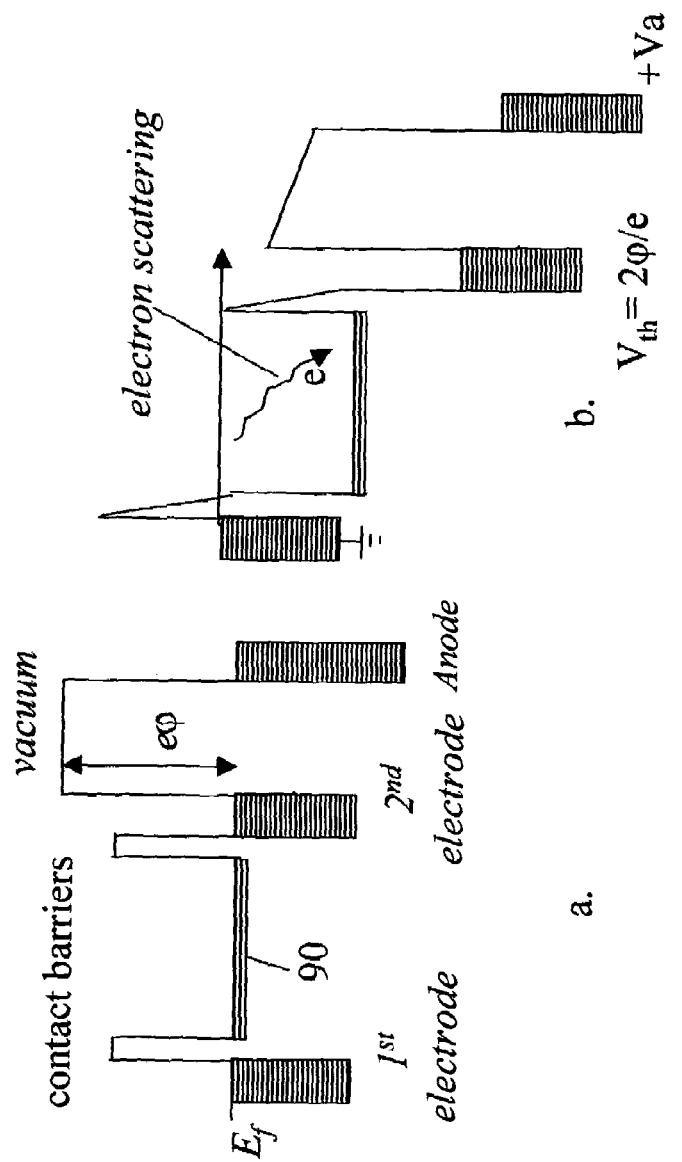
FIG. 9 shows the energy band diagram for the ballistic electron propagation along the nanotube.
Figure 10:
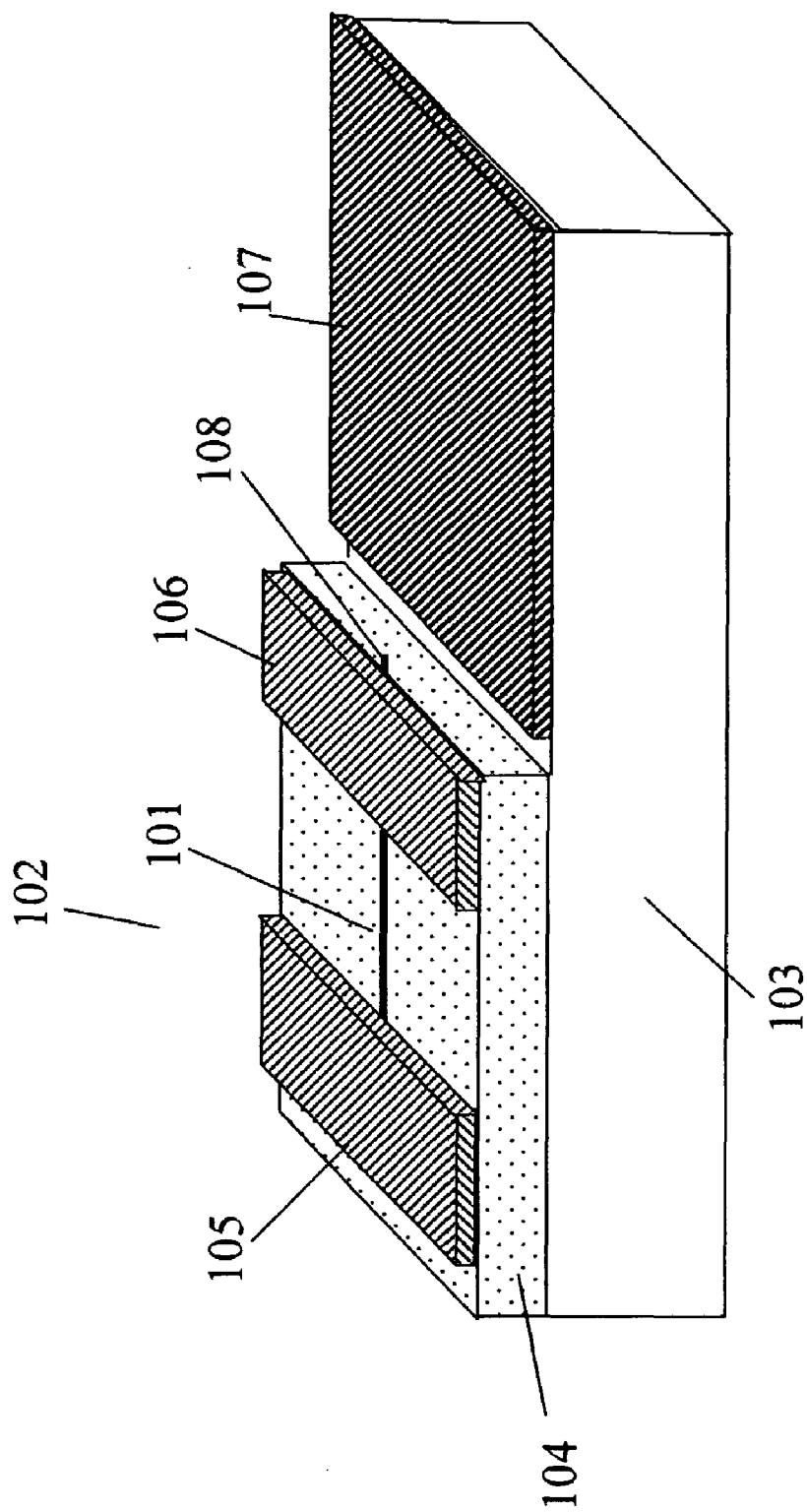
FIG. 10 shows the Triode 4 with ballistic electron propagation in the nanotube.

The ballistic Triode 4, described in FIGS. 9 and 10, relies on a different mechanism of the electron escape into vacuum. The electrons in the nanotube are known to move ballistically, i.e. without experiencing any resistance due to strong quantization of the energy spectrum in the nanotube (quantum size effect), which suppresses all mechanisms of the electron scattering, see e.g. S. Frank et al Science V.280,p.1744,1998. and A. Urbina et al, Phys.Rev.Lett. V.90,p106603–1,2003. If the voltage applied to the nanotube exceeds the value of the work function for the nanotube, which is $\phi \sim 5$ eV (see. e.g. W. A. de Heer, et al Science, v.270, p.1179, 1995), then electrons, acquiring this energy during ballistic propagation along the nanotube, will be capable of escaping into vacuum without any field induced electron emission from the nanotube tip.

FIG. 9 illustrates the ballistic mechanism of electron escape into vacuum. As shown in FIG. 9a, with no bias applied, the nanotube with two contacts is represented by the energy, counted from the bottom of the conduction band 90, and two barriers of energies 91 and 92 with respective resistances $R_1$ and $R_2$. sandwiched by the electron reservoirs of metal contacts with the top energy equal to the Fermi level $E_f$. This forms the electron emission circuit (cold cathode). The anode electrode is separated from the cathode by a vacuum space.

When the voltage $V_2$ is applied to the second electrode relative to the first electrode, as shown in FIG. 9b, the electrons tunnel from the first electrode into the nanotube and move ballistically to the positively biased second electrode, thus acquiring, like in vacuum, the energy $eV_2$. Under these conditions, as in the case of a hot cathode, the electrons accumulating at the nanotube tip, form an electron cloud and can be extracted from the nanotube into vacuum with any anode voltage $V_A > V_2$. The emission current is controlled by the efficiency of the source electrode to supply electrons into the nanotube via electron tunneling through the barrier 91. If the barriers are equal in their tunneling transparencies, the threshold voltage $V_{th}$ for electrons to gain the energy $\phi$ is $V_{th} = 2\ \phi/e$. This unique mechanism of electron emission allows the emission threshold $V_{th}$ to be independent of the nanotube dimensions.

The threshold voltage however depends on the contact resistances. The minimal contact resistance to the nanotube is quantized due to the energy spectrum quantization in the nanotube and equal to 12.9 kOhm. Higher resistances are easily achievable. If the input nanotube resistance $R_1$ (at $1^{st}$ electrode, FIG. 9a) is chosen to be much higher than the output resistance $R_2$ (at $2^{nd}$ electrode), than the applied voltage will drop basically across the resistance $R_1$. In this case, $V_{th} \approx \phi/e$, while the output current will be small and controlled by the high resistance $R_1$.

The above described physical process of electron escape is based on the ballistic electron propagation in the nanotube. This assumption however may not be valid, at least for the entire electron population, as the electron energy becomes high: different mechanisms of the electron scattering may affect the ballistic process and lower the electron energy, as schematically indicated in FIG. 9b. The most aggressive mechanisms of the electron scattering are optical phonon and electron-electron scattering. The latter one depends on the total electron concentration in the nanotube. Therefore, semiconductor type nanotube, where the electron concentration is relatively low, is preferable. It is also preferable to have a single walled nanotube because of stronger energy quantization in it. The final number of electrons reaching the nanotube tip with the energy (p may be a small fraction of the entire population, like in other ballistic models for high energy electron escape into vacuum, see e.g. T. Komoda et al, SID-2003, p.910.

To increase the probability of electron escape into vacuum, the distance between the contacts should be made as small as possible. For example, for the distance between the contacts of 0.5 μm and the electron escape energy $\phi = 5$ eV the traveling time along the nanotube is $\sim 10^{-13}$ s, which is comparable with the characteristic time for electron-optical phonon scattering, when the electron energy spectrum is not quantized. The quantum size effect, which is a characteristic feature for the nanotube, will strongly reduce all scattering rates for the high energy electrons. This implies that a realistic fraction of electrons would move along the nanotube ballistically, gain the energy $\phi$ and thus produce the anode current at low anode voltages.

FIG. 10 shows the structure of the Triode 4. The nanotube 101 is placed on the cathode 102, which is elevated over the plane of the substrate 103 by a dielectric film 104. Two electrodes, 105 and 106, are attached to the nanotube, thus forming the cathode circuit. The anode conductive layer is placed on the substrate 103 next to the cathode, and the nanotube tip 107 is protruded into the anode area, to maximize the electron emission efficiency. As in the previous designs, according to the present invention, the contact geometry implies very low input and output capacitances. Any relatively small anode voltage $Va > V_2$ will be sufficient to provide the anode current. Because of a very small electron fly time along the nanotube and small input and output capacitances the device operational frequency is expected to be in a tera-hertz range.

All four triode structures discussed above can be extended to four- or five-terminal devices by adding additional electrodes shifted laterally further away from the anode electrode of the triode.

While there has been shown, described, and pointed out fundamental novel features of the present invention as applied to preferred embodiments thereof, it will be understood that various omissions and substitutions and changes in the devices described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A triode, comprised of the following elements:
    a nanotube placed on the insulating substrate and having two metal contacts on top of it; first contact is placed at the end of the nanotube, while the second contact is placed essentially in the middle of the nanotube, on top of the insulating layer preliminary disposed on the nanotube; both said metal contacts are connected respectively to the first and second electrodes; the third electrode is placed next to the second electrode, on the plane below the plane of said second electrode; the nanotube is placed in the direction normal to the edge of the first electrode neighboring the second electrode; one of the tips of the nanotube is left exposed and protrudes into the area of the third electrode.

2. The triode of claim 1 in which the nanotube is semi-conducting.

3. The triode of claim 1 in which the nanotube is single walled.

4. The triode of claim 1 in which the nanotube is single walled and semi-conducting.

5. The triode of claim 1 in which an array of parallel nanotubes is placed on said insulating substrate, so that all the nanotubes are oriented normal to said edge of the first electrode and have tips exposed and protruded into the area of said third electrode.

6. A triode comprised of the following components:
    first, second and third electrodes placed on the insulating substrate, said first, second and third electrodes having respectively first, second and third conductive layers; said first conducting layer is disposed on the dielectric layer preliminary deposited on the substrate; said second and third electrodes are placed on the substrate, with the second electrode being placed next to one of the edges of said first conducting layer, while the third electrode is placed some distance away from said second electrode; a nanotube is placed on said first conducting layer in the direction essentially normal to said one of the edges of said first conducting layer, with nanotube tip protruding into the area of said second electrode.

7. The triode of claim 6, wherein the nanotube is a single walled nanotube.

8. The triode of claim 6, wherein the nanotube is a metal type nanotube.

9. The triode of claim 6, wherein the nanotube is single walled and metal nanotube.

10. The triode of claim 6 wherein an array of nanotubes is placed on said first electrode, with the nanotubes oriented nonnal to said one of the edges of said first conductive layer with their exposed tips protruding into the area of said second electrode.

11. The triode of claim 6 in which an additional conducting layer is deposited on the first electrode on the part of the nanotube, leaving exposed the nanotube tip protruding into the area of said second electrode.

12. The triode of claim 6 wherein said additional metal layer is disposed onto entire nanotube including the tip of nanotube.

13. A triode comprising three electrodes laterally shifted from each other and placed on an insulating substrate; the first, second and third electrodes contain respectively first, second and third conducting layers; said first and third conductive layers are deposited on the dielectric film preliminary deposited on the substrate surface; said second conductive layer is disposed on the substrate next to one of the edges of said first conductive layer, while said third conductive layer is placed away from the second electrode; a small pad of nanotube catalytic material is deposited on said second conductive layer in close proximity to said one of the edges of said first conductive layer, and the nanotube is grown normally to the substrate plane; the nanotube height is such that the nanotube tip is slightly below or reaches the plane of said first conductive layer.

14. The triode of claim 13, wherein an array of the nanotubes is grown normally to the substrate plane in close proximity to said one of the edges of said first conductive layer.

15. The triode of claim 13 wherein the nanotube is single walled.

16. The triode of claim 13 wherein the nanotube is a metal type nanotube.

17. The triode of claim 13 wherein the nanotube is metal type and single walled.

18. The triode of claim of 13 wherein said additional metal layer is disposed onto the entire nanotube including the tip of nanotube.

19. The triode of claim 18 wherein said additional metal layer is made from a material with a low work function for electron emission into vacuum.

* * * * *